(12) United States Patent
Bin-Nun et al.

(10) Patent No.: US 8,621,876 B2
(45) Date of Patent: Jan. 7, 2014

(54) RUGGEDIZED INTEGRATED DETECTOR COOLER ASSEMBLY

(75) Inventors: Uri Bin-Nun, Chelmsford, MA (US); Jose P. Sanchez, Lawrence, MA (US); Xiaoyan Lei, Boxborough, MA (US)

(73) Assignee: Flir Systems, Inc., Wilsonville, OR (US)

( * ) Notice: Subject to any disclaimer, the term of this patent is extended or adjusted under 35 U.S.C. 154(b) by 449 days.

(21) Appl. No.: 12/896,472

(22) Filed: Oct. 1, 2010

(65) Prior Publication Data

US 2012/0079838 A1 Apr. 5, 2012

(51) Int. Cl.
 *F25B 9/00* (2006.01)

(52) U.S. Cl.
 USPC ..................................... 62/6; 439/2; 439/382

(58) Field of Classification Search
 USPC ............. 62/6, 51.1, 259.2; 361/791; 439/2–4, 439/382
 See application file for complete search history.

(56) References Cited

U.S. PATENT DOCUMENTS

| | | | | |
|---|---|---|---|---|
| 4,486,068 A | * | 12/1984 | Ghigliotti et al. | 439/825 |
| 4,833,898 A | * | 5/1989 | Chudy et al. | 62/51.1 |
| 5,263,880 A | * | 11/1993 | Schwarz et al. | 439/733.1 |
| 7,587,896 B2 | * | 9/2009 | Bin-Nun et al. | 60/517 |
| 2007/0261407 A1 | | 11/2007 | Bin-Nun et al. | |

FOREIGN PATENT DOCUMENTS

| | | | |
|---|---|---|---|
| EP | 0339836 | | 11/1989 |
| EP | 461002 A | * | 12/1991 |
| EP | 0494001 | | 7/1992 |
| GB | 1290990 | | 9/1972 |

OTHER PUBLICATIONS

Acopian. Parallelable redundant power supplies with audible alarms. Published before Oct. 9, 2009. www.acopian.com. Examiner Reference A.*
EPO Patent Translation. Machine translation of EP 461002 A. Feb. 28, 2013.*

* cited by examiner

*Primary Examiner* — John Pettitt
*Assistant Examiner* — Tareq M Alosh
(74) *Attorney, Agent, or Firm* — Haynes and Boone, LLP

(57) ABSTRACT

Provided for an embodiment is a support member for a cryogenic cooler's expander. The support member provides stiffness to the expander to reduce movements at the expander's distal end and may increase the natural frequency of the expander. The support member may increase the natural frequency of the expander at least about two times in the bending and/or twisting sense. The bending natural frequency of the expander and support sub-assembly may be at least about two times greater or lower than the natural frequency of the electrical wires that connect an infrared sensor to a control processing unit to reduce the maximum stress applied to the electrical wires during use. In another embodiment, additional or redundant electrical pathways are provided for connections between the infrared sensor and the CPU. Furthermore, shock absorber and/or shock diverters are provided on rigid pins that connect the electrical wires to the CPU.

20 Claims, 5 Drawing Sheets

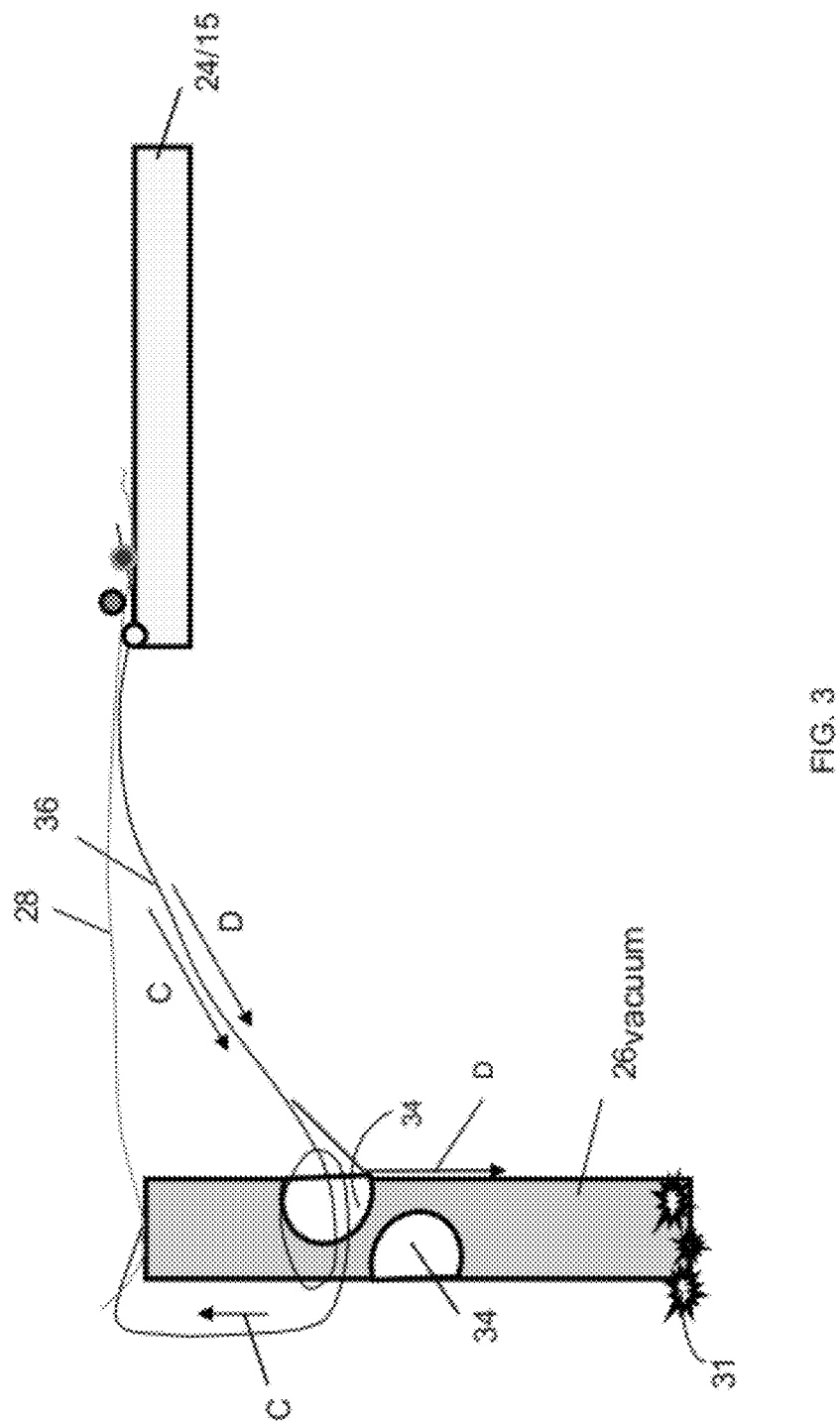

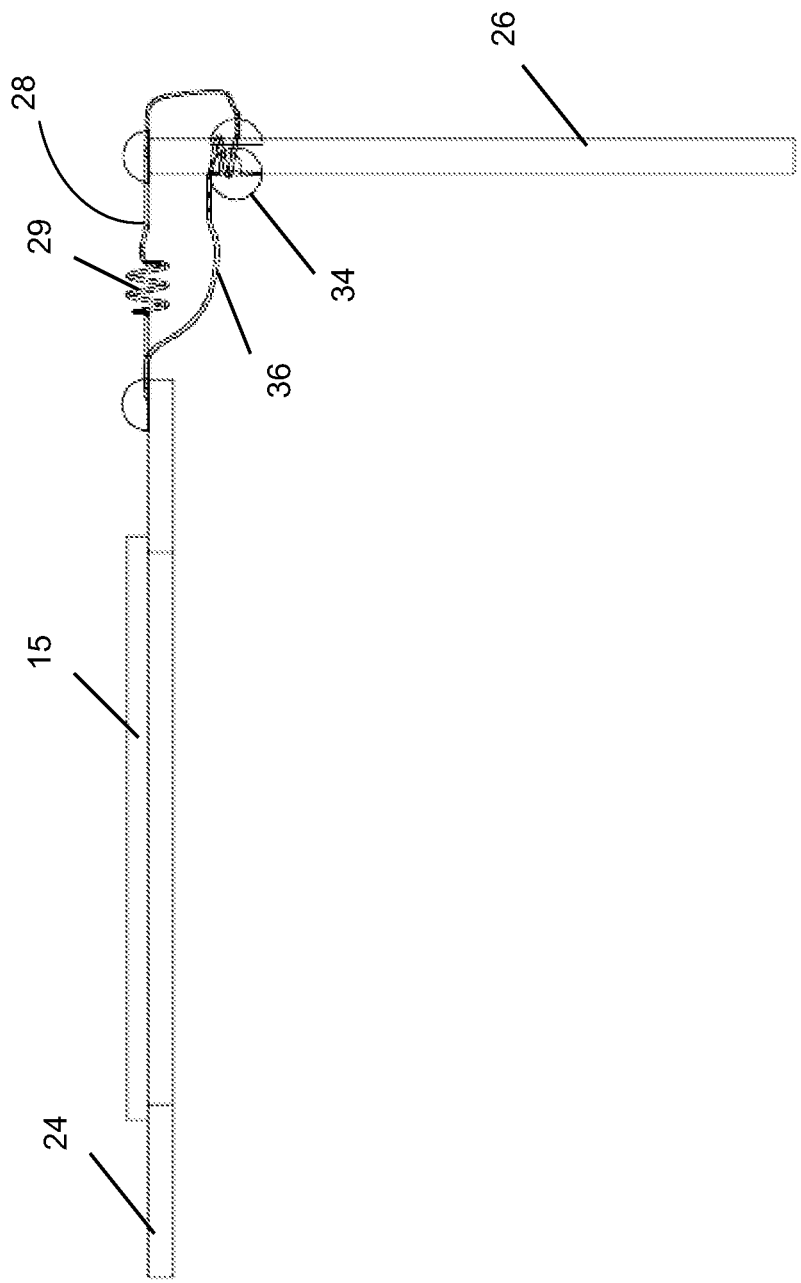

RUGGEDIZED INTEGRATED DETECTOR COOLER ASSEMBLY

FIELD OF THE INVENTION

This invention generally relates to integrated detector cooler assemblies (IDCA) and more specifically to IDCA modified to withstand external loads applied to the IDCA or the cryogenic coolers/infrared sensors that incorporate the inventive IDCA.

BACKGROUND OF THE INVENTION

Infrared cameras play an important role in the surveillance, law enforcement and military applications. Infrared cameras provide thermal images of objects in a thermal scene without illumination. Infrared cameras contain infrared (IR) sensors or focal plane array (FPA), which should be cooled to function properly. In some applications, infrared sensors are cooled to cryogenic temperature range. For these applications, a Stirling Cycle Rotary Cooling Engines are used to provide the cooling power.

Conventional Stirling engines generally have a compressor and an expander connected to a crank mechanism driven by an electrical motor. The compressor, also known as a pressure wave generator, is attached to the warm end of the expander and delivers acoustic power (compressor PV work) into the expander warm end inlet. Compressor PV work is the integration of the pressure-volume curve over one thermodynamic cycle or one complete revolution of the crank shaft. Compressor PV work has a unit of energy, and when derived over time, it is defined as acoustic power. The expander recovers this work at the cold end by causing the gas to expand and thus absorb heat from external power source such as an IR sensor. The gas expansion is achieved mechanically by placing the expander piston and compression piston at 90° mechanical phase to each other relative to the crank shaft. A working fluid, typically a noble gas, is compressed at the warm end and is expanded at the cold end. At the distal tip of the expander coldwell, when the expander piston is being pulled backward to iso-thermally expand the working gas, heat is absorbed from the load and very low temperatures are achieved due to efficient thermal isolation between the warm and cold end of the expander unit. Temperature can reach down to the cryogenic range, e.g., about 77° K. The IR sensor or FPA is attached to the coldwell to be cooled. A conventional Stirling engine is described in U.S. Pat. Nos. 7,555,908 and 7,587,896 and references cited therein, which are incorporated herein by reference in their entireties.

In the field, infrared cameras are often mounted on law enforcement and military vehicles, including helicopter, drones, naval vessels, military all-terrain vehicles, etc. These vehicles often experience shocks, such as recoils from a discharging weapon. For example, recoils from cannon fires can send damaging vibrations to equipments installed in the vicinity. These vibrations can damage the expander in the Stirling engine, and more specifically the weld between the cold finger and the Dewar body, which can cause the loss of vacuum within the Dewar. This load can also apply a bending stress on the cold finger, which can cause a displacement of the IR sensor or the FPA, which is mounted on the distal end of the cold finger. The vibrations can also break the wires that connect the IR sensor to the central processing unit.

Hence, there remains a need for rugged integrated IR detector and cooler assembly that can withstand damaging vibrations encountered in the field.

SUMMARY OF THE INVENTION

Hence, the invention is directed to a ruggedized integrated detector cooler assembly where the expander or expander cylinder is supported to reduce the effects of a load being applied to the integrated assembly during use. The assembly is incorporated into a cooler, preferably a cryogenic cooler and preferably a Stirling engine. The cooler is used to keep an infrared sensor cooled.

In one embodiment, the expander is supported by a support member, preferably a support tube. The support member has a larger proximal end and a smaller distal end. In a preferred embodiment, the support member is connected to the expander at the smaller distal end and is connected to the cooler at the larger proximal end. The support member provides additional stiffness to the expander to reduce movements at the distal end of the expander. The support member also increases the natural frequency of the expander. In one embodiment, the support member increases the natural frequency of the expander at least about two (2) times in the bending and/or twisting sense.

In another embodiment, the bending natural frequency of the expander and support sub-assembly is at least about two times greater or lower than the natural frequency of the electrical wires that connect the infrared sensor to a control processing unit to reduce the maximum stress applied to the electrical wires.

In another embodiment, additional or redundant electrical pathways are provided for the connection between the infrared sensor and the CPU. Furthermore, shock absorber and/or shock diverters are provided on the rigid pins that connect the electrical wires to the CPU.

BRIEF DESCRIPTION OF THE DRAWINGS

In the accompanying drawings, which form a part of the specification and are to be read in conjunction therewith and in which like reference numerals are used to indicate like parts in the various views:

FIG. 3 is a schematic drawing showing an improved Dewar pin and improved electrical connections between the Dewar pin and the IR sensor; and FIG. 3A is a schematic drawing showing an alternative electrical connection.

DETAILED DESCRIPTION OF THE PREFERRED EMBODIMENTS

Figure 1:
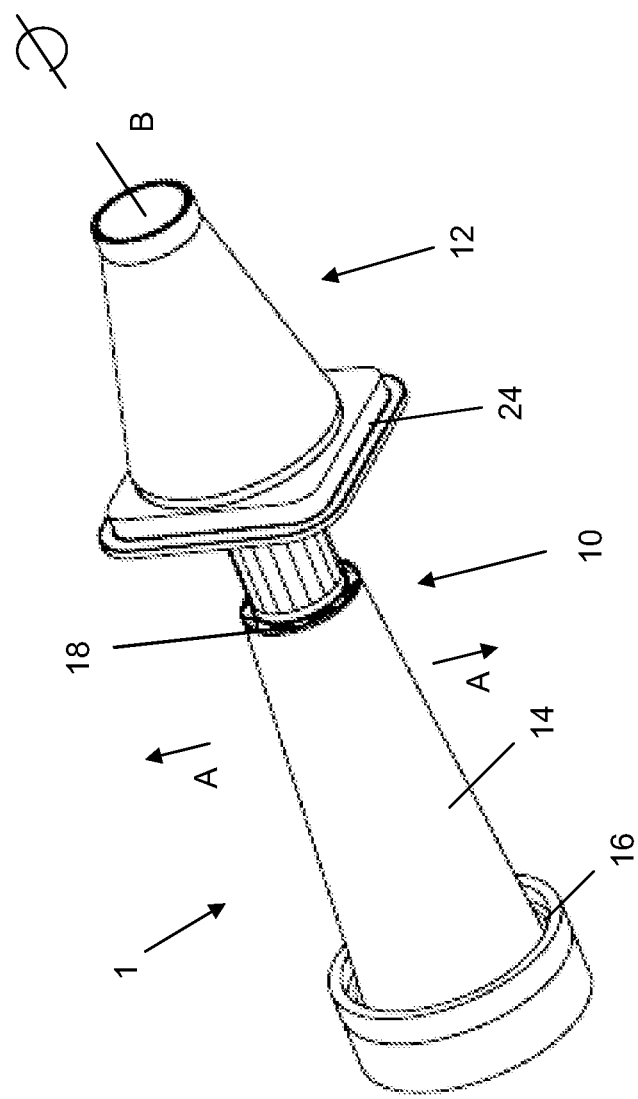
FIG. 1 is a perspective view of an integrated detector cooler assembly (IDCA) with the outer housing omitted for clarity in accordance with the present invention.
Figure 2:
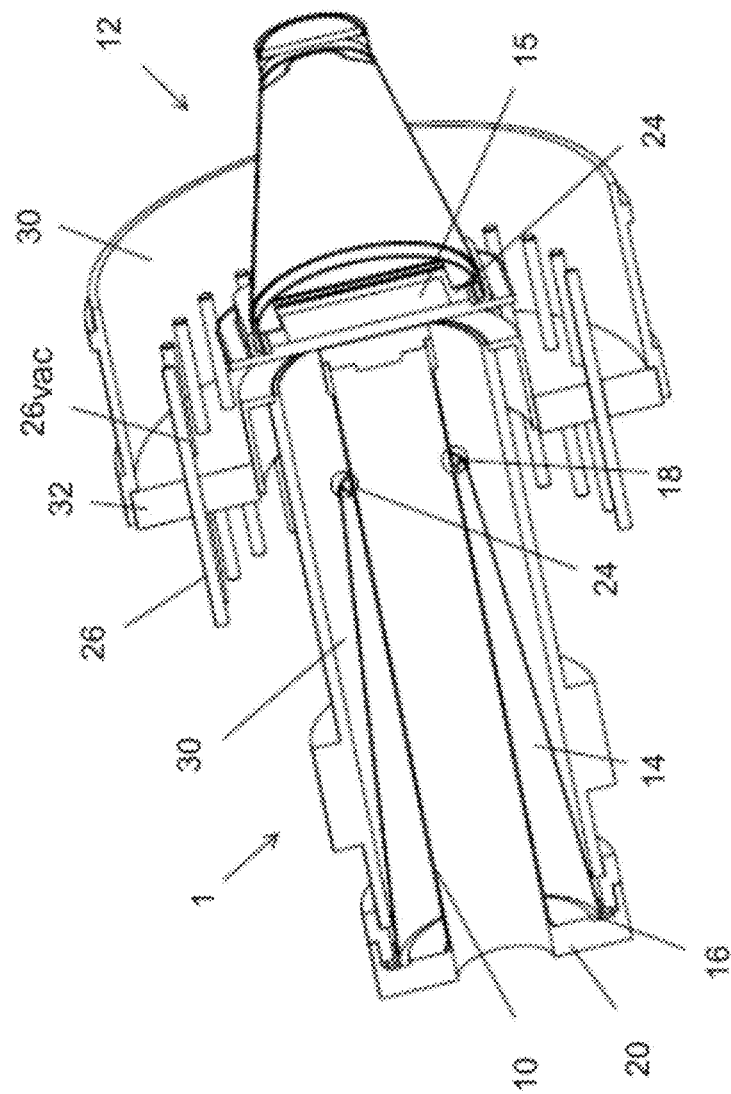
FIG. 2 is a cross-sectional view of the IDCA shown in FIG. 1 with parts of the Dewar assembly shown.
Figure 2A:
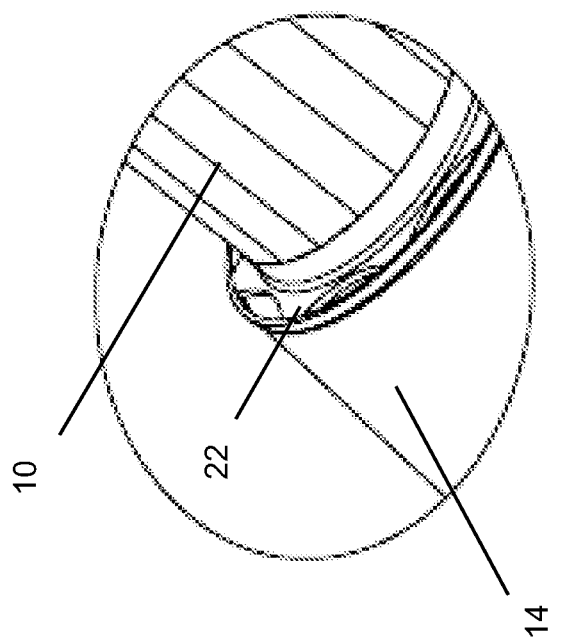
FIG. 2A is an expanded view of element 2A shown FIG. 2.

A first embodiment of integrated detector cooler assembly (hereinafter "IDCA") 1 present invention is illustrated in FIGS. 1, 2 and 2A. IDCA 1 comprises expander 10 and detector 12. Expander 10 is supported by and is at least partially covered by expander support tube 14. Support tube 14 increases the stiffness of expander 10 to reduce the effects of a shock and/or vibrations applied on expander 10 from a load caused, for example, by a firing of a weapon attached to the same platform as IDCA 1 or from an external source impacting expander 10. An expansion piston and a regenerator matrix within the expansion piston for exchanging heat with the working fluid are provided for reciprocal motions within expander 10. These two elements are omitted in the figures of the present patent application for clarity. An expansion space is provided between the distal end of the expansion piston and the distal end of expander 10 to provide cooling power to an IR sensor or a FPA (hereinafter "sensor") 15 mounted within detector 12 of IDCA 1 as described further below.

IDCA 1 and a compressor are housed in a housing or outer shell. The compressor and expander 10 are parts of a cooler or a cryogenic cooler, preferably a Stirling engine. The space within the housing, which is shown in part in FIG. 2, is a vacuum or partial vacuum space.

Preferably, support tube 14 has a hollow truncated conical shape with larger proximal end 16 and smaller distal end 18, and is connected at proximal end 16 to the interface between Dewar flange 20, which forms a part of the housing, and expander 10, as best shown in FIG. 2. Preferably, this connection is accomplished by welding, laser welding and preferably by electron beam welding. At distal end 18, support tube 14 is connected to expander 10 via upper flange 22. Preferably, upper flange 22 has a star-shaped configuration as best shown in FIG. 2A. In this embodiment, the connection between upper flange 22 and expander 10 is preferably continuous and the connection between upper flange 22 and support tube 14 is preferably intermittent to minimize the conductive heat transfer through support tube 14, which thermally connects the warm end of the Stirling engine at or proximate to Dewar flange 20 to expander 10 proximate to the cold expansion space. Such heat transfer is considered a heat leakage or loss and is minimized by the intermittent contacts between upper flange 22 and support tube 14 and by minimizing the thickness of support tube 14. In an alternative embodiment, the intermittent contacts may be deployed at the interface of upper flange 22 and expander 10. In yet another embodiment, the intermittent contacts can be deployed at proximal end 16 between support tube 14 and Dewar flange 20.

Another advantage of upper flange 22 is that it is flexible to allow relative movement caused by differential thermal expansion or contraction between expander 10 and support tube 14. Advantageously, upper flange 22 is positioned substantially orthogonal to expander 10 and to support tube 14 to allow optimal flexibility. Alternatively, upper flange 22 is allowed to slide relative to expander 10 while being connected to support tube 14 or vice versa to handle the thermal expansion or contraction between expander 10 and support tube 14.

Preferably, support tube 14 is made from a strong and light weight material to support expander 10. Additionally, support tube 14 has a relatively thin thickness in order to further reduce the heat leakage or loss described above. In one embodiment, support tube 14 is made from titanium (Ti) and has a thickness from about 1.5 to about 4 mils, preferably from about 2 mils to about 3 mils, and more preferably about 2.5 mils. Titanium is preferred due to its strength and relatively low conductive thermal conductivity. Other suitable materials also include, but are not limited to, Ti6AL-4V.

An advantage of support tube 14 is that it can increase the natural frequency of expander 10. The natural frequency, f, of a simple mechanical system can be expressed as $$f = \frac{1}{2\pi}\sqrt{\frac{k}{M}}, \quad (1)$$

where k is the effective spring constant of the system and M is the mass of the system. Higher natural frequency of a mechanical system, also known as resonance frequency, is beneficial because the vibration caused by a load experienced by expander 10 in the field generally has a low frequency. Moving the natural frequency of expander 10 away from the load vibration reduces the effects or impacts that the load vibration would have on expander 10. A modal analysis, e.g., finite element analysis (FEA) or finite difference (FD), shows that support tube 14 doubles the natural frequency of expander 10 in a bending mode as well as a twisting mode. A bending mode is a vibration tending to bend expander 10 along arrows A, and a twisting mode is a vibration twisting expander about its longitudinal axis along arrow B. The results of the modal analysis are shown below.

TABLE 1

| Mode of Vibration | Expander 10 without support tube 14 | Expander 10 with support tube 14 | Shorter expander 10 with support tube 14 |
|---|---|---|---|
| Bending | 770 Hz | 1550 Hz | 1720 Hz |
| Twisting | 3400 Hz | >6000 Hz | 5797 Hz |
| Max displacement of cold finger 10 at support 22 | 0.0336 inch | 0.0050 inch | 0.0016 inch |

As shown, the natural frequency due to the bending moment can be reduced further by shortening the length of expander 10. In one example, expander 10 can be shortened from about 0.25 inch to about 0.31 inch. Additionally, the maximum displacement of support plate 24, where an IR sensor 15 is mounted, is less due to the lower bending natural frequency by a factor of about six (0.0336/0.0050) in the example shown above. This also lowers any load on sensor 15 applied.

Displacement of expander 10 at sensor 15 can also place a load on the electrical wires that connect the sensor 15 mounted on support plate 24 to a control processor unit (CPU) that receives IR information from sensor 15. As best shown in FIG. 2, sensor 15 is mounted on support plate 24 and a plurality of pins 26 is placed around sensor 15/plate 24 outside the IR radiation shield of detector unit 12. IR radiation shields are discussed in commonly owned U.S. Pat. No. 6,144,031, which is incorporated herein by reference in its entirety. Pins 26 extend from the Dewar vacuum space 30 inside IDCA 1 to outside of IDCA 1. The portions of pins 26 within Dewar vacuum space 30 are designated as $26_{vacuum}$. Electrical wires 28 connect each pin 26 to sensor 15, as best shown in FIG. 3, to transmit the IR information received by sensor 15 through pins 26 to the CPU. The present invention further improves the connection of these wires to better withstand the vibrations encountered by IDCA 1 in the field. Such vibrations can sever the wires and cause IDCA 1 to fail to function, and can shear pins 26 which may cause a loss of vacuum inside IDCA 1.

In accordance to another aspect of the present invention, the natural frequency(ies) of wires 28 are designed to be different than that of expander 10, so that in the event that expander 10 is excited by vibrations proximate to its natural frequency, which would resulted in large physical loads on expander 10, the impact on wires 28 is minimized. Preferably, the natural frequency of wires 28 is different than both the bending and twisting natural frequencies of expander 10. More preferably, the natural frequency of wires 28 is at least about 2 times under or above both the bending and twisting natural frequencies of expander 10. In one preferred embodiment the natural frequency of wires 28 is at least different than the bending natural frequency of expander 10, or at least about 2 times under or above the bending natural frequency of expander 10, since the bending natural frequency has a higher tendency to displace sensor 15 and wires 28.

The natural frequency of electrical wires depends on the material, the diameter and the length of the wires. A modal analysis of electrical wires 28 made from a metal alloy, for example Manganin® alloys, which typically comprises 86% copper, 12% manganese, and 2% nickel, was conducted. The results are as follows.

TABLE 2

| Case† | Wire 28 Diameter (inch) | Wire 28 Length (inch) | Expander 10 Max RMS Movement* (inch) | Wire 28 Natural Frequency (Hz) | Expander 10 Natural Frequency* (Hz) | Max Wire 28 Stress‡ (psi) |
|---|---|---|---|---|---|---|
| 1 | 0.001 | 0.25 | 0.005 | 805 | 1570 | 7010 |
| 2 | 0.002 | 0.25 | 0.005 | 1650 | 1570 | 39,537 |
| 3 | 0.004 | 0.25 | 0.005 | 1950 | 1570 | 12,233 |
| 4 | 0.001 (conventional) | 0.25 | 0.033 | 805 | 780 | 142,000 |

*Expander 10's movements and natural frequencies are similar to those from Table 1.
†Cases 1-3 include support tube 14 and case 4 does not.
‡Measured at connections to pins 26.

The results show that in cases 1 and 4 by reducing the movement of expander 10 and by moving the natural frequency of expander 10 with the addition of support tube 14, the maximum stress encountered by wires 28 reduces from about 142,000 psi to about 7,010 psi for a 20+ folds reduction. The results also show that increasing the diameter of wires may not be as beneficial. A two-fold increase (case 2) actually increases the wire's natural frequency and matching it with the expander's natural frequency. A four-fold increase (case 3) brings the wire's natural frequency above and beyond the expander's natural frequency and reduces the maximum stress encountered by wires 28; however, larger diameter wires would increase conduction heat loss from sensor 15, which is kept at cryogenic temperatures, through wires 28 and pins 26. Hence, in a preferred embodiment, the natural frequency of expander 10 is increased by using support tube 14, while the natural frequency of wires 18 is maintained to be lower than that of expander 10.

In accordance to another aspect of the present invention, the pin portion $26_{vacuum}$, of pins 26 that is within Dewar vacuum space and connected wires 28 is modified as best shown in FIG. 3. The vibration load represented as elements 31 generally enters pins 26 where they are connected to base 32 of detector unit 12. As vibration 31 travels through pins 26, it may sever the connection with wire 28 at the top of portion $26_{vacuum}$. In this embodiment, a number of shallow slots 34 are carved or formed on the shaft of portion $26_{vacuum}$. In one example, pins 26 have a diameter of about 0.030 inch and slots 34 have depths of about 0.015 inch or less. Slots 34 are preferably filled with an electrically conductive gel or epoxy. Suitable conductive epoxies include, but are not limited to, EPO-TEK-E4110 conductive epoxy for vacuum vessels.

Filled slots 34 can block elastic wave front path along pins 26 and may direct these waves, which are caused by vibrations 31, away from the top of pins $26_{vacuum}$, where wires 28 are attached. Filled slots 34 can also provide vibration damping to absorb some of the vibration. Preferably, slots 34 are arranged in an overlapping fashion along pins $26_{vacuum}$ as shown in FIG. 3 to eliminate clear, direct path for the elastic wave front to reach the top of pins $26_{vacuum}$. In other words, slots 34 divert at least some of the vibrations away from the connections to wires 28. Although two slots 34 are shown in FIG. 3, any number of slots 34 can be provided. Vibration 31 also travels along pins 26 in the opposite direction, and if necessary or desired filled slots 34 can be provided on the portions of pins 26 that are outside of Dewar vacuum space 30.

In accordance to another aspect of the present invention, looped wires 36 can be employed to provide additional electrical paths, as shown in FIG. 3. Unlike wires 28, which are direct electrical connections between sensor 15 and pins 26, looped wires 36 are generally longer and loop around pins $26_{vacuum}$ before being attached at the top of pins $26_{vacuum}$. Looped wires 36 provides two additional electrical paths: a path along the entire length of wires 36 shown by arrows C, and a path along part of wires 36 and through slot(s) 34 and along portions of pins $26_{vacuum}$ shown by arrows D. In this embodiment, if wires 28 are severed, wires 36 can still provide electrical connection. Even if both wires 28 and 36 are severed from the top of pins $26_{vacuum}$ electrical connection along arrows D is still available.

As As shown, looped wires 36 can wrap around slots 34, and the latter can be anchors for looped wires 36. Wires 36 may have at least one loop or one bend to absorb vibration or shock. The electrical conductive gel or epoxy assures an electrical connected at slots 34. These anchors are located further from the tip of pins $26_{vacuum}$, where the vibration is less and the pin movement is smaller. Furthermore, looped wires 36 are longer than wires 28 and preferably have an amount of slacks in the wires. These slacks can also absorb some of the vibrations without putting stress or strain on wires 36. Additionally, slacks can be provided in wire 28 as shown as element 29 in FIG. 3A to absorb vibration. Preferably, slacks 29 comprise one or more coils as shown.

While it is apparent that the illustrative embodiments of the invention disclosed herein fulfill the objectives stated above, it is appreciated that numerous modifications and other embodiments may be devised by those skilled in the art. Therefore, it will be understood that the appended claims are intended to cover all such modifications and embodiments, which would come within the spirit and scope of the present invention.

We claim:

1. An integrated cooler, comprising:
    a compressor and an expander disposed inside a housing, wherein the expander is coupled to an infrared sensor to cool the infrared sensor, wherein the infrared sensor is electrically coupled to a central processing unit by a first wire coupled to a solid conductive pin that is at least partially disposed inside the housing,
    wherein the pin comprises at least one vibration diverter disposed along a shaft of the pin and separated from an end surface of the pin, wherein the at least one vibration diverter comprises a slot at least partially formed in a surface of the shaft of the pin that is disposed in an interior vacuum portion of the housing, and wherein the at least one vibration diverter is formed without penetrating entirely through the pin or through to any other vibration diverter in the pin.

2. The integrated cooler of claim 1, wherein the pin further comprises at least one vibration absorber.

3. The integrated cooler of claim 2, wherein the slot comprises a blind slot at least partially formed in a surface of the shaft of the pin, and wherein the vibration absorber comprises a vibration absorbing material positioned within the slot.

4. The integrated cooler of claim 3, wherein the absorbing material comprises an electrically conductive epoxy.

5. The integrated cooler of claim 1, wherein the wire comprises a first wire providing a first electrical connection between the infrared sensor and the pin, and wherein the integrated cooler further comprises a second wire longer than the first wire and coupling the infrared sensor to the pin, wherein the second wire provides at least a second electrical connection between the infrared sensor and the pin.

6. The integrated cooler of claim 5, wherein at least one of the wires comprises at least one bend, loop or coil.

7. The integrated cooler of claim 5, wherein the second wire is attached to and in electrical contact with the at least one vibration diverter and the end surface of the pin.

8. The integrated cooler of claim 1, further comprising:
a support member connecting the expander to the housing, wherein a first natural frequency of a combination of the support member and the expander is greater than a second natural frequency of the expander.

9. The integrated cooler of claim 8, wherein the first natural frequency is at least about two times higher than the second natural frequency.

10. The integrated cooler of claim 9, wherein the first natural frequency is at least about two times higher than the second natural frequency in a bending sense.

11. The integrated cooler of claim 9, wherein the first natural frequency is at least about two times higher than the second natural frequency in a twisting sense.

12. The integrated cooler of claim 8, wherein the first natural frequency is different from a third natural frequency of the first wire.

13. The integrated cooler of claim 12, wherein the first natural frequency is at least about two times higher than the third natural frequency.

14. The integrated cooler of claim 13, wherein the first natural frequency in a bending sense is at least about two times higher than the third natural frequency.

15. The integrated cooler of claim 8, wherein the support member has a tubular, truncated cone shape with a larger proximal end and a smaller distal end, and wherein the support member is coupled to the expander at the distal end and to the housing at the proximal end.

16. The integrated cooler of claim 15, wherein at least one of the connections of the support member to the housing and to the expander is an intermittent connection.

17. The integrated cooler of claim 15, wherein the connection between the support member and the expander comprises a flange adapted to minimize the conductive heat transfer between the support member and the expander.

18. The integrated cooler of claim 17, wherein the flange comprises a star configuration, and wherein the flange is welded to one of or both the support member and the expander.

19. The integrated cooler of claim 17, wherein the flange is sufficiently flexible to accommodate relative thermal expansion or contraction between the support member and the expander.

20. The integrated cooler of claim 17, wherein the flange is slidable relative to the support member and/or relative to the expander to accommodate relative thermal expansion or contraction between the support member and the expander.

* * * * *